United States Patent [19]

Laine

[11] 4,378,120
[45] Mar. 29, 1983

[54] SUPPLEMENTARY MUDGUARD FOR AUTOMOBILE

[76] Inventor: Leo I. Laine, Polttimonkatu 10, 26130 Rauma 13, Finland

[21] Appl. No.: 225,234

[22] Filed: Jan. 15, 1981

Related U.S. Application Data

[63] Continuation of Ser. No. 65,234, Aug. 9, 1979, abandoned.

[30] Foreign Application Priority Data

Dec. 13, 1978 [FI] Finland .................................. 783822

[51] Int. Cl.³ .............................................. B62B 9/16
[52] U.S. Cl. ...................................... 280/154; 24/331; 24/259 R; 280/153 R; 403/405
[58] Field of Search ........... 280/152 R, 153 R, 153 A, 280/154, 154.5 R; 24/73 FT, 73 MF, 73 PM, 81 BM, 81 FT; 296/15

[56] References Cited

U.S. PATENT DOCUMENTS

| 1,934,135 | 11/1933 | McCollum | 280/154.5 R |
| 3,195,921 | 7/1965 | Robinson | 280/154 R |
| 3,784,226 | 1/1974 | Wilfert et al. | 280/153 A |

FOREIGN PATENT DOCUMENTS

| 233279 | 5/1925 | United Kingdom | 280/152 R |
| 1284583 | 8/1972 | United Kingdom | 280/152 R |
| 1291114 | 9/1972 | United Kingdom | 280/152 R |

Primary Examiner—Robert J. Spar
Assistant Examiner—Donald W. Underwood
Attorney, Agent, or Firm—Ladas & Parry

[57] ABSTRACT

A supplementary mudguard to be attached inside a mudguard proper of an automobile. The rear end of the supplementary mudguard is arranged to form an ejector passage with the floor of the automobile in order to provide an even flow of air in the space between the supplementary mudguard and the mudguard proper.

1 Claim, 6 Drawing Figures

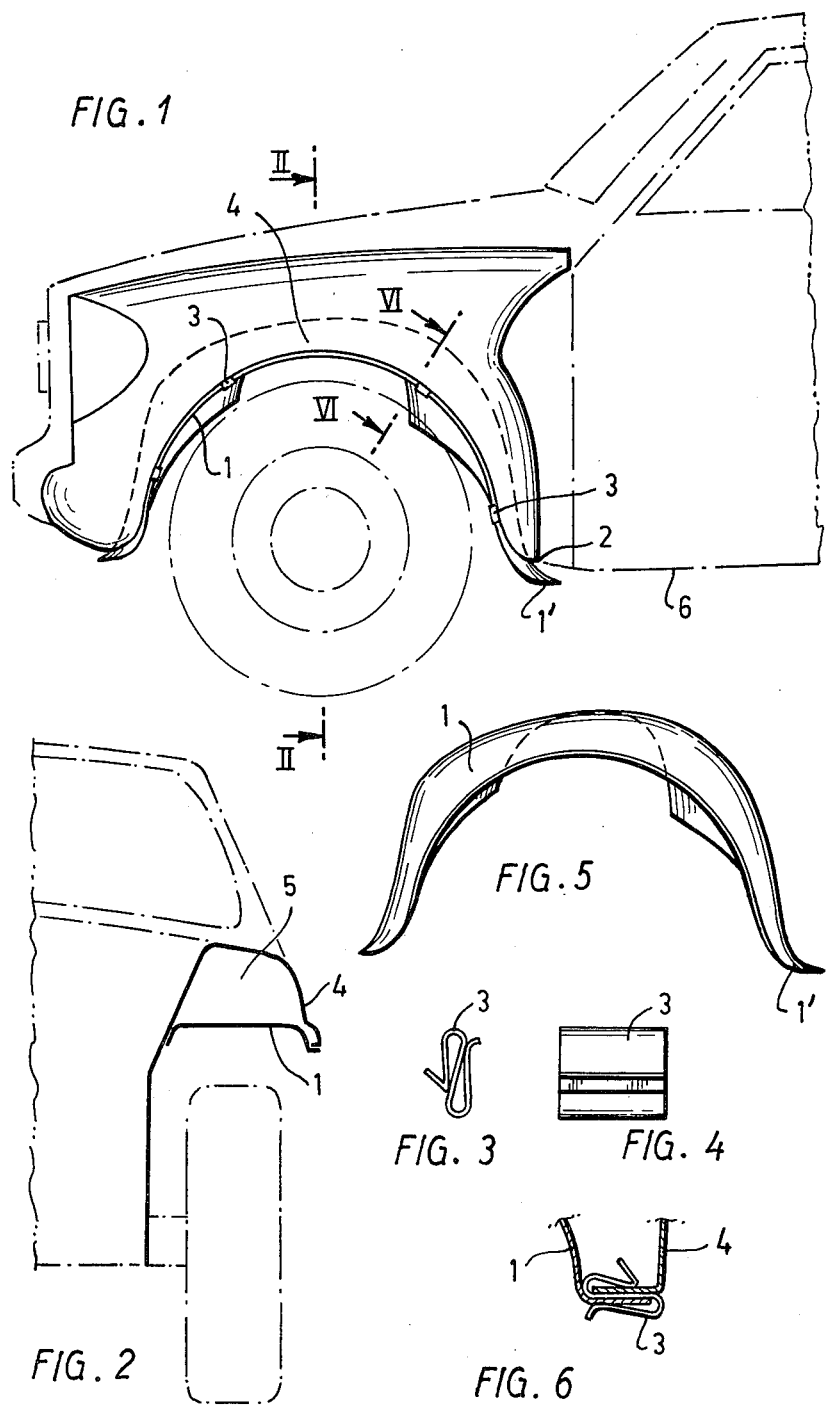

SUPPLEMENTARY MUDGUARD FOR AUTOMOBILE

This is a continuation of co-pending application Ser. No. 065,234 filed Aug. 9, 1979 and now abandoned, now abandoned.

The subject of the present invention is a supplementary mudguard to be mounted inside the mudguard proper of an automobile.

According to studies that have been performed, the front mudguards of an automobile are subjected to corrosion to a higher extent than the other parts of the car body. This results from the circumstance that, owing to the construction of the car body, there are all sorts of cavities and pockets as well as body components fastened by means of spot welding on the inside of the mudguards. Moreover, the mudguards are subject to impacts from stones detached by the tyres from the road surface, which stones break the coating of paints and corrosion-protective agents used for protecting the mudguards. This is why the salt used for binding the dust and for melting the ice reaches direct contact with the metal used in mudguard constructions and causes rapid and expensive corrosion in the mudguard metal.

Inside the mudguards by means of which attempts have been made to eliminate the above drawbacks are previously known. They do, however, not produce a uniform and sufficient flow of air in the passage between the inside mudguard and the mudguard proper, besides which their covering area allows part of the mudguard proper unprotected within a critical area, and under these circumstances these known inside mudguards are defective in respect of their functioning. Moreover, their fastening in connection with the manufacturing of the car is difficult if separate fastening irons must be used and, if they are secured in position by themselves, without separate fastening means, they do not meet the requirements of traffic safety.

An object of the present invention is to provide a novel supplementary mudguard for automobile which eliminates the above drawbacks. This object is achieved by means of a supplementary mudguard in accordance with the present invention, which is characterized in that, in order to produce a uniform and efficient flow of air in the space between the supplementary mudguard and the mudguard proper, the rear end of the supplementary mudguard has been designed so that it forms a passage resembling an ejector between the car floor and the supplementary mudguard.

When the car moves, the flow of air between the car floor and the road surface is strong and uniform. Thereby the flow of air taken by the ejector from the passage is uniform, and an efficient uniform flow of air is produced in the space between the supplementary mudguard and the mudguard proper, which flow of air keeps said space clean and dry. At the same time, the supplementary mudguard in accordance with the invention of course, like the other, known supplementary mudguards do, prevents access of dirt, stones, salt, and of other detrimental materials into the mudguard constructions.

The outer edge of the supplementary mudguard is appropriately provided with press fasteners, by means of which the supplementary mudguard can be fastened to the mudguard proper rapidly and, in view of traffic security, safely.

Below, an embodiment of the invention will be described with reference to the attached schematical drawing.

FIG. 1 shows the supplementary mudguard as mounted in position, as a side view,

FIG. 2 shows a section along line II—II in FIG. 1,

FIGS. 3 and 4 show a fastener of the supplementary mudguard as a profile and as a side view, FIG. 5 shows the supplementary mudguard separately, as a side view, and FIG. 6 shows how the supplementary mudguard is mounted on the mudguard proper by means of the fastener of FIGS. 3 and 4.

The supplementary mudguard is indicated with numeral 1, the mudguard proper with numeral 4, and the space between them with numeral 5. The rear end 1' of the supplementary mudguard 1 is arranged so that it extends somewhat underneath the car floor 6 and forms a passage 2. Since, during movement of the car, there is a uniform strong flow of air between the car floor 6 and the road surface, an ejector effect is produced in the passage 2, because of which a uniform flow of air is formed in the space 5 between the supplementary mudguard and the mudguard proper, which flow of air efficiently keeps the faces limiting the space clean and dry. The supplementary mudguard is preferably made of a plastics material but may also be made of metal.

Mounting of supplementary mudguard has been a relatively labourious procedure. By means of the fastener 3 formed as a double clip the supplementary mudguard can be snapped to the mudguard proper in a convenient way. The fastener 3 is made of a stiff plastics material and the upper clip (FIG. 6) engaging the edge of the mudguard proper 4 is given a greater clamping force than the lower clip engaging the edge of the supplementary mudguard 1, whereby relative movement between the mudguard 4 and the fastener 3 will not take place but only between the supplementary mudguard 1 and the fastener 3. Thus the painting of the mudguard 4 will not be damaged in spite of the fact that a certain necessary play is achieved between the mudguard 4 and the supplementary mudguard 1. Fasteners 3 are first attached to the supplementary mudguard and are thereafter snapped in place at the mudguard proper.

What I claim is:

1. A supplementary mudguard comprising a rigid member which is adapted to be mounted inside the mudguard proper of an automobile, characterized in that, in order to produce a uniform and efficient flow of air in the space between the supplementary mudguard and the mudguard proper, the rear end of the supplementary mudguard is bent to extend underneath the car floor essentially in the direction thereof to form an ejector-like passage between the car floor and the supplementary mudguard, and wherein the outer edge thereof is provided with at least one elastic fastener formed as a double clip for engaging the edge of the mudguard proper and the edge of the supplementary mudguard, the clip engaging the mudguard proper being stiffer than the clip engaging the supplementary mudguard, the clamping force between the fastener and the mudguard proper thus being greater than the clamping force between the fastener and the supplementary mudguard.

* * * * *